April 29, 1947.     G. M. MAGRUM     2,419,651
HYDRAULIC DAMPING DEVICE CYLINDER CONSTRUCTION
Filed Jan. 31, 1944     2 Sheets-Sheet 2
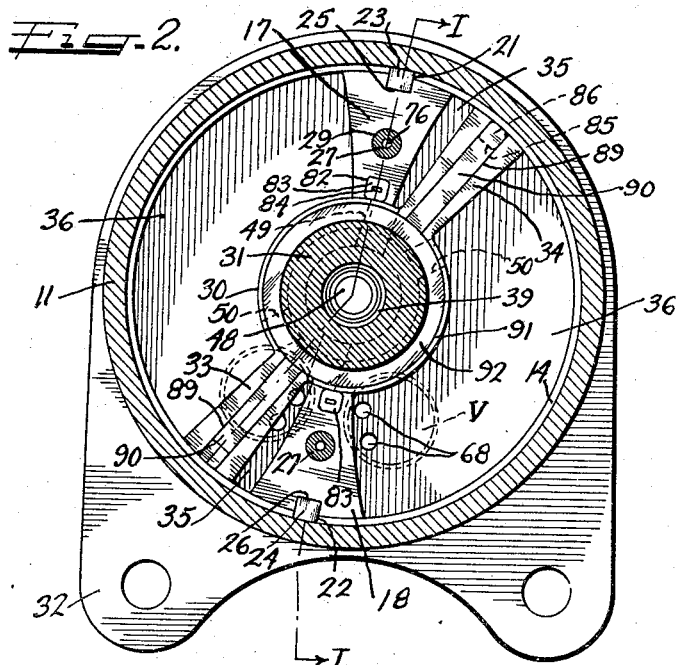
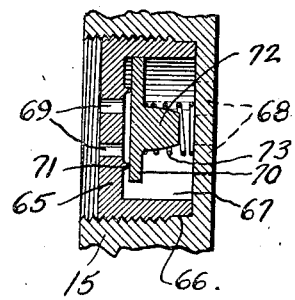
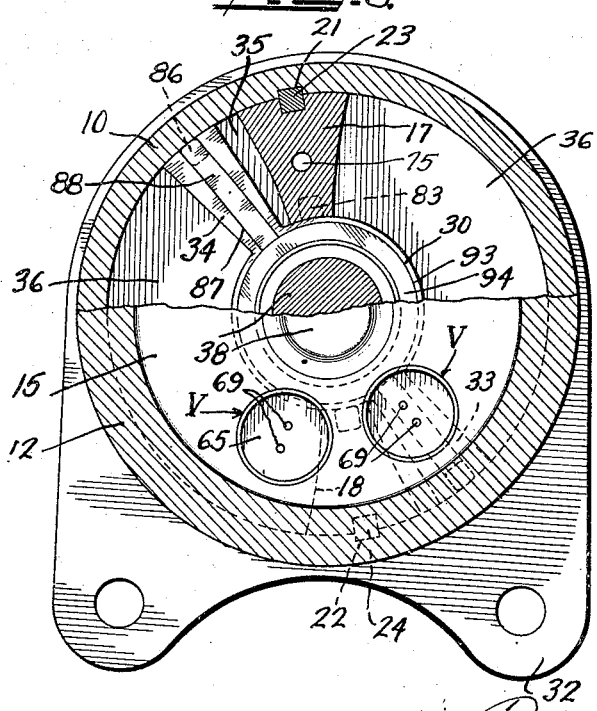
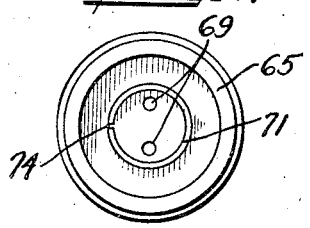
Inventor
GERVASE M. MAGRUM.

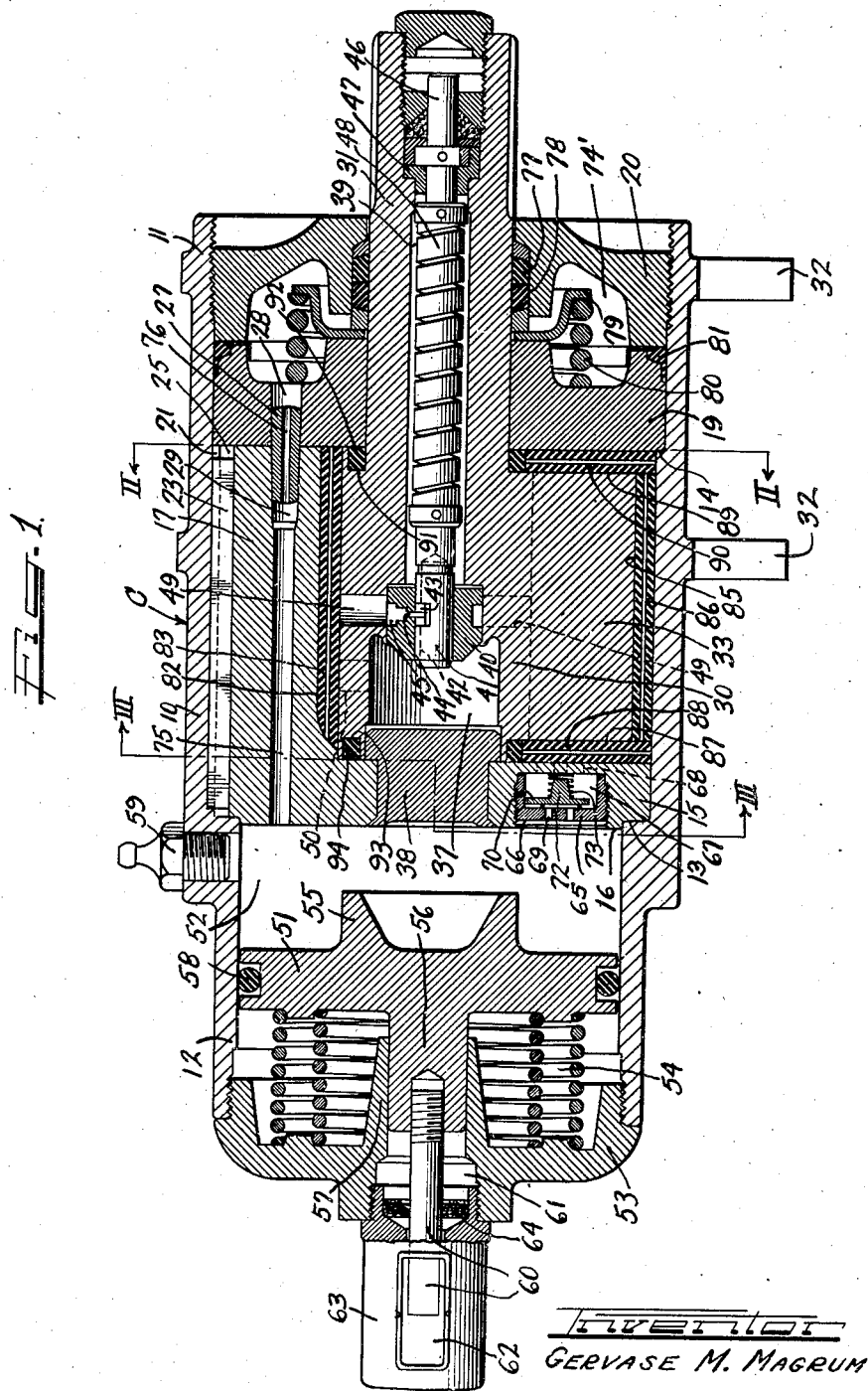

Patented Apr. 29, 1947

2,419,651

UNITED STATES PATENT OFFICE 2,419,651

HYDRAULIC DAMPING DEVICE CYLINDER CONSTRUCTION

Gervase M. Magrum, Buffalo, N. Y., assignor to Houdaille-Hershey Corporation, Detroit, Mich., a corporation of Michigan Application January 31, 1944, Serial No. 520,427

6 Claims. (Cl. 309—2)

My invention relates to hydraulic damping devices of the rotary type adapted particularly for functioning as shock absorbers on vehicles or as shimmy dampers for wheels on airplane landing gears.

Where hydraulic devices of the type referred to are to be used, particularly in airplane service where the temperature may vary through a wide range, as for example, from 160° F. to 65° below zero, the devices must be built to function satisfactorily with comparatively light hydraulic fluid such as oil. It therefore becomes necessary to reduce to a minimum manufacturing tolerances and running clearances, and further to provide sealing means in order to eliminate leakage, particularly internal leakage.

It is, therefore, an important object of my invention to provide improved construction and association of parts to reduce to a minimum manufacturing tolerances and running clearances, together with improved arrangement of sealing means between internal operating parts of the device to cut down to a minimum internal leakage so that the device may function at maximum efficiency at all times throughout a wide temperature range.

The various improvement features of my invention are embodied in the structure shown on the drawings in which:

Figure 1 is a longitudinal section on plane I—I Figure 2;

Figure 2 is a section in plane II—II Figure 1;

Figure 3 is a section on plane III—III Figure 1;

Figure 4 is an enlarged section of one of the replenishing valve assemblies; and Figure 5 is an inner end view of a valve cage.

In the device shown, the cylinder C has a middle wall portion 10 and the outer and inner wall portions 11 and 12. The inner wall portion 12 is of less inner diameter than the middle wall portion 10 to leave the annular shoulder 13, while the outer portion 11 is of larger inner diameter than the middle portion to leave the annular shoulder 14. In the inner end of the cylinder part 10 is the inner end wall 15 which seats against the inner shoulder 13 and has a boss 16 fitting into the outer end of the cylinder part 12. Integral with the end wall 15 are the diametrically opposite abutment legs 17 and 18 which, with the wall 15, fit against the inner face of the cylinder part 10. The abutment legs terminate at their outer ends in the plane of the outer shoulder 14. Fitting into the cylinder part 11 is the outer end wall 19 which seats against the shoulder 14 and against the outer ends of the abutment legs, a clamping wall 20 threading into the end of the cylinder part 11 to exert pressure against the end wall 19 to hold it securely against the shoulder 14 and the abutment legs with the inner end wall 15 seating against the shoulder 13.

The cylinder part 10 is slotted internally between the shoulders 13 and 14 to provide keyways 21 and 22 for keys 23 and 24 which engage in keyways 25 and 26 in the abutment legs 17 and 18 so as to hold the abutment structure against rotation in the cylinder. Tapered dowel pins 27 extend through tapered holes 28 in the outer end wall 19 and are pressed into matching tapered holes 29 at the ends of the abutment legs 17 and 18 for holding the abutment legs intimately against the wall of cylinder part 10. When the outer end wall 19 is pressed in by the clamping wall 20, the peripheral engagement of the wall against the shoulder 14, in addition to its engagement against the ends of the abutment legs, will hold the end wall against inward deflection under pressure when the device is in operation, and the abutment legs will be held against the wall of cylinder part 10.

The piston structure for the device comprises the cylindrical hub 30 extending between the inner and outer end walls 15 and 19, and the shaft 31 which extends through the bearing opening in the end wall 19 and through the clamping wall 20. At its outer end the shaft is adapted for connection with a lever (not shown) for connection with a structure to be controlled, while the cylinder C is provided with ears or wings 32 whereby it may be secured on a support.

The piston hub has the vanes 33 and 34 thereon engaging at their outer ends against the cylinder wall 10 and these vanes together with the piston hub and the abutment legs, divide the cylinder space between the end walls 15 and 19 into diametrically opposite hydraulic working chambers 35, 35 and 36, 36.

At its inner end the piston hub has the bore or chamber 37 which receives the bearing plug 38 secured in the end wall 15. Extending outwardly from this chamber through the piston hub and shaft is the bore 39, a valve seat plug 40 being interposed. The seat plug has the cylindrical valve 41 therein which has the bore 42 connected by the port 43 with the orifice 44 which extends from the channel 45 surrounding the seat plug. In the arrangement shown, the valve is connected by a bi-metallic thermostat coil 48 with an adjusting pin 46 in the plug assembly 47 in the outer end of the bore 39 by means of which pin the valve 41 may be set for overlap of its port 43 with the orifice 44 for the desired resistance to the flow through the valve. Ports 49 extending radially through the piston hub connect the valve plug channel 45 with the hydraulic working chambers 35, 35, while ports 50 connect the chamber 37 with the hydraulic working chambers 36, 36. Upon oscillation of the piston, the displaced hydraulic fluid will flow from one set of working chambers into the other against the flow resistance caused by the orifice 44.

Means are provided for keeping the hydraulic working chambers at all times replenished and filled with hydraulic fluid. Within the cylinder part 12 is a plunger 51 between which and the outer end wall 15 is the reservoir space 52. The outer end of the cylinder part 12 is closed by a detachable cover 53 between which and the plunger 51 is a spring assembly 54 which tends to shift the plunger inwardly toward the end wall 15, the annular stop boss 55 on the plunger limiting such inward movement. The plunger movement is guided by the stem 56 which projects into the guide flange 57 extending from the cover 53. A sealing gasket 58 between the plunger and the cylinder wall prevents leakage past the plunger from the chamber 52. A check valve controlled nipple 59 communicates with the chamber 52 and through which hydraulic fluid may be charged under pressure into the chamber for flow therefrom into the working chambers through replenishing valve structures V in the end wall 15. After the hydraulic chambers have been filled, the pressure will force the plunger 51 outwardly against the resistance of the springs 54 and then, after closure of the nipple 59, the spring assembly will tend to force the plunger inwardly for flow of the hydraulic fluid from the chamber 52 into the hydraulic chambers to keep them at all times completely filled. A gauge pin 60 extends from the plunger stem outwardly through a passageway 61 in the cover 53, and after the device has been charged with hydraulic fluid and the plunger is shifted outwardly, the end of the gauge pin may be observed through a window 62 in a cap 63 threading into the cover 53. Preferably packing 64 in the cap surrounds the pin. The length of the pin exposed through the window 62 will correspond with the distance the plunger has been shifted outwardly when the device was charged with hydraulic fluid. The pin will then indicate when it is time for recharging of the device.

Describing now the valve structures V, two of such structures are shown at opposite sides of one of the abutments, such as the abutment 18, for flow of the hydraulic fluid from the reservoir chamber 52 into the hydraulic working chambers 35 and 36 at opposite sides of the abutment. Each valve structure comprises a cup-shaped cage 65 threading into a recess 66 in the inner end wall 15. The cage cooperates with the bottom wall of the recess to provide a valve chamber 67 connected with the respective hydraulic working chamber through ports 68, the valve chamber being connectable with the reservoir 52 through ports 69 in the bottom wall of the cage. As shown on Figure 2, the ports 68 are at one side of the bottom wall of the recess 66 so as to be close to the abutment 18. Within the valve chamber is the valve disk 70 for seating against the annular seat ridge 71 surrounding the ports 69, the valve disk having the stem 72 surrounded by a spring 73 which abuts the valve disk and the bottom wall of the recess 66 and tends to hold the valve disk seated. The valves will permit flow of hydraulic fluid from the reservoir 52 into the respective working chambers but will prevent reverse flow. A small radial notch 74 is provided in each seat ridge 71, these notches permitting escape of air or gas from the working chambers into the reservoir after the valves have been firmly seated by their springs and by the hydraulic pressure in the working chambers. The working chambers are thus kept free of air which might interfere with the efficient operation of the shock absorber. These vent openings 74 are too restricted to permit any material escape of hydraulic fluid from the working chambers into the reservoir.

The outer side of the outer end wall 19 and the inner side of the clamping wall 20 are recessed to provide the annular space 74'. As shown, a passageway 75 extends through the abutment leg 17 and the end wall 15 to connect the reservoir space 52 with the hole 29 in which the dowel pin 27 is inserted, this pin having the passageway 76 therethrough. The space 74' is thus at all times in connection with the reservoir 72 and is kept filled with hydraulic fluid so that the fluid pressure against the outer sides of the end walls 15 and 19 is balanced.

To prevent leakage to the exterior of the shock absorber along the piston shaft, a suitable packing assembly 77 is provided in the recess 78 in the clamping wall 20, this packing assembly being held compressed around and against the shaft by the member 79 under pressure of the spring 80. The escape of hydraulic fluid from the working chambers out between the cylinder wall and the end wall 19 is prevented by sealing or packing material 81.

The operation of the hydraulic device thus far described is well known in the art. Upon relative rotary movement of the cylinder structure and piston structure, hydraulic fluid is displaced from one set of working chambers into the other, the rate of flow and consequently the shock absorbing or damping power of the device being controlled by the orifice 44. The spring pressed plunger 51 exerts at all times a predetermined pressure against the fluid in the reservoir 52 to keep the working chambers fully replenished and filled by way of the replenishing valve structures V. After a period of heavy service of the hydraulic device, some leakage of hydraulic fluid to the exterior may have occurred, and when the device is to be serviced and the gauge pin 60 indicates that the reservoir 52 is not filled, then the device may be recharged with hydraulic fluid by way of the check valve nipple 59.

In order that the hydraulic device may function in full efficiency at all times, internal leakage between adjacent high and low pressure hydraulic working chambers must be held down to a minimum. This is accomplished by means of packing strips between various operating parts. Each of the abutment legs 17 and 18 has a channel 82 in its inner end extending from the outer end of the legs and terminating close to the end wall 15. As shown, these channels are of rectangular cross-sections and in each channel is inserted a packing strip 83 comprising a body of resilient elastic material provided with a core 84 to which it is bonded. The core may be of metal, or of non-metallic material to be axially rigid but laterally somewhat flexible. The strip body, besides being resilient and elastic, should be of material which will resist deterioration by the hydraulic fluid and which has sufficient wicking characteristics so as to absorb hydraulic fluid, such as oil, for lubricating the surface engaged by the strip, the strips 83 being held in engagement with the outer surface of the piston hub 30 to prevent direct leakage flow between the high and low pressure hydraulic working chambers at opposite sides of the abutments when the device is in operation. The bodies of the strips could be of some form of synthetic rubber sufficiently porous to absorb and hold oil, or the bodies could be of some rubber-like composition which would have sufficient wicking characteristics.

Each of the piston vanes 33 and 34 has in its outer end a channel 85 extending from one side of the vane to the other, and in these channels sealing strips 86 are inserted for engagement with the inner surface of the cylinder part 10 to prevent leakage between the ends of the vanes and the cylinder wall from the high pressure to low pressure working chambers. The vanes at their inner sides are also provided with channels 87 for sealing strips 88 for sealing engagement with the inner end wall 15 to prevent leakage between working chambers around the inner sides of the vanes. Channels 89 may also be provided in the outer sides of the vanes to receive sealing strips 90 for sealing engagement with the outer end wall 19 to prevent leakage between working chambers. The outer end of the piston hub 30 has the channel 91 therein for receiving a sealing ring 92 to surround the piston shaft and to have sealing engagement with the outer end wall 19, the channels 89 in the outer sides of the piston vanes communicating with the annular channel 91 so that the sealing strips 90 will abut the sealing ring 92. The sealing ring will cooperate with the sealing strips 90 to prevent leakage between working chambers, and the sealing ring will prevent leakage from the working chambers out between the shaft and the end wall 19.

At its inner end the piston hub is shown provided with an annular channel 93 for the sealing ring 94 for sealing engagement with the inner end wall 15 to prevent leakage between working chambers. Thus, with the sealing means interposed between the relatively moving and operating parts of the hydraulic device, internal leakage between adjacent hydraulic working chambers is reduced to a minimum. As the outer ends of the abutment legs are intimately engaged by the end wall 19 under pressure of the clamping wall 20, there can be no leakage between working chambers past the outer ends of the legs and therefore no sealing means are necessary between the legs and the end wall.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a hydraulic device of the type disclosed, a cylinder wall having an inner annular internal shoulder and an outer internal annular shoulder, an inner end wall seating against said inner shoulder and having abutment legs extending outwardly therefrom with their outer ends terminating in the plane of said outer annular shoulder, an outer end wall within the outer end of said cylinder seating against said outer shoulder and the outer ends of said abutment legs, and a clamping member threading into the outer end of the cylinder wall to exert pressure against said outer end wall to hold said end wall intimately against said outer shoulder and outer ends of the abutment legs and with said inner wall securely seated against said inner shoulder.

2. In a hydraulic device of the type disclosed, a cylinder wall having an inner annular internal shoulder and an outer internal annular shoulder, an inner end wall seating against said inner shoulder and having abutment legs extending outwardly therefrom with their outer ends terminating in the plane of said outer annular shoulder, an outer end wall within the outer end of said cylinder seating against said outer shoulder and the outer ends of said abutment legs, a clamping member threading into the outer end of the cylinder wall to exert pressure against said outer end wall to hold said end wall intimately against said outer shoulder and outer ends of the abutment legs and with said inner wall securely seated against said inner shoulder, said outer end wall having tapered openings therethrough and said abutment legs having tapering openings at their outer ends forming continuations of the tapering openings through said outer end wall, and tapered pins driven into said aligned tapering openings for holding said abutment legs intimately against the inner face of said cylinder wall.

3. In a hydraulic device of the type disclosed, a cylinder wall having an intermediate annular internal shoulder and a second shoulder disposed adjacent to one end of the cylinder wall spaced from said intermediate shoulder, a wall member seating against said intermediate shoulder and having abutment legs extending outwardly therefrom with their outer ends terminating in the plane of said outer annular shoulder, a wall member seating against said second shoulder and the outer ends of said abutment legs, a clamping member secured to the end portion of the cylinder outwardly beyond said second shoulder to exert pressure against said wall member to hold the latter intimately against said second shoulder and the outer ends of the abutment legs and thereby holding said inner wall member securely seated against said intermediate shoulder, said cylinder wall extending axially beyond said inner wall member oppositely to said abutment legs to provide a hydraulic chamber, and means closing the end of the cylinder extension.

4. In a hydraulic device of the type disclosed, a cylinder wall having an intermediate annular internal shoulder and a second shoulder disposed adjacent to one end of the cylinder wall spaced from said intermediate shoulder, a wall member seating against said intermediate shoulder and having abutment legs extending outwardly therefrom with their outer ends terminating in the plane of said outer annular shoulder, a wall member seating against said second shoulder and the outer ends of said abutment legs, a clamping member secured to the end portion of the cylinder outwardly beyond said second shoulder to exert pressure against said wall member to hold the latter intimately against said second shoulder and the outer ends of the abutment legs and thereby holding said inner wall member securely seated against said intermediate shoulder, said cylinder wall extending axially beyond said inner wall member oppositely to said abutment legs to provide a hydraulic chamber, and means closing the end of the cylinder extension, said outer end member and said clamping member being constructed and arranged to provide a hydraulic chamber therebetween, one of said abutment legs having a passageway therethrough communicating with both of said chambers.

5. In a hydraulic device of the type disclosed, a cylinder wall having an intermediate annular internal shoulder and a second shoulder disposed adjacent to one end of the cylinder wall spaced from said intermediate shoulder, a wall member seating against said intermediate shoulder and having abutment legs extending outwardly therefrom with their outer ends terminating in the plane of said outer annular shoulder, a wall member seating against said second shoulder and the outer ends of said abutment legs, a clamping member secured to the end portion of the cylinder outwardly beyond said second shoulder to exert pressure against said wall member to hold the latter intimately against said second shoulder and the outer ends of the abutment legs and thereby holding said inner wall member securely seated against said intermediate shoulder, said cylinder wall extending axially beyond said inner wall member oppositely to said abutment legs to provide a hydraulic chamber, and means closing the end of the cylinder extension, said outer end member and said clamping member being constructed and arranged to provide a hydraulic chamber therebetween, one of said abutment legs having a passage therethrough communicating with both of said chambers, said passage having a pin therein connecting said outer wall member and said abutment leg against relative rotation, said pin having a passageway therethrough for uninterrupted communication between said chambers through said passage.

6. In a hydraulic device of the type disclosed, a cylinder wall having an intermediate annular internal shoulder and a second shoulder disposed adjacent to one end of the cylinder wall spaced from said intermediate shoulder, a wall member seating against said intermediate shoulder and having abutment legs extending outwardly therefrom with their outer ends terminating in the plane of said outer annular shoulder, a wall member seating against said second shoulder and the outer ends of said abutment legs, a clamping member secured to the end portion of the cylinder outwardly beyond said second shoulder to exert pressure against said wall member to hold the latter intimately against said second shoulder and the outer ends of the abutment legs and thereby holding said inner wall member securely seated against said intermediate shoulder, said cylinder wall extending axially beyond said inner wall member oppositely to said abutment legs to provide a hydraulic chamber, means closing the end of the cylinder extension, said outer end member and said clamping member being constructed and arranged to provide a hydraulic chamber therebetween, one of said abutment legs having a passageway therethrough communicating with both of said chambers, and means affording communication between the chamber on the extension side of said inner wall member and on the opposite side of the inner wall member and including one-way valve structure.

GERVASE M. MAGRUM.

REFERENCES CITED

The following references are of record in the file of this patent:

UNITED STATES PATENTS

| Number | Name | Date |
|---|---|---|
| 785,492 | Holmberg | Mar. 21, 1905 |
| 905,023 | Trebilcock | Nov. 24, 1908 |
| 1,045,766 | Adams | Nov. 26, 1912 |
| 207,871 | Horton et al. | Sept. 10, 1878 |
| 2,115,383 | Christensen | Apr. 26, 1938 |
| 2,180,795 | Christensen | Nov. 21, 1939 |
| 2,339,042 | Anderson | Jan. 11, 1944 |
| 2,377,674 | Chisholm | June 5, 1945 |